US009945159B2

(12) United States Patent
Carnevali (10) Patent No.: US 9,945,159 B2
(45) Date of Patent: Apr. 17, 2018

(54) SUPPORT DEVICE HAVING VARIABLE SECURITY LEVEL

(76) Inventor: Jeffrey D. Carnevali, Seattle, WA (US)

( * ) Notice: Subject to any disclaimer, the term of this patent is extended or adjusted under 35 U.S.C. 154(b) by 733 days.

(21) Appl. No.: 12/799,659

(22) Filed: Apr. 28, 2010

(65) Prior Publication Data

US 2011/0266230 A1    Nov. 3, 2011

(51) Int. Cl.
| | |
|---|---|
| *F16M 13/00* | (2006.01) |
| *E05B 73/00* | (2006.01) |
| *E05B 17/20* | (2006.01) |
| *E05B 37/02* | (2006.01) |
| *E05B 65/00* | (2006.01) |
| *E05C 1/10* | (2006.01) |
| *F16M 11/04* | (2006.01) |
| *G06F 1/16* | (2006.01) |
| *E05B 37/00* | (2006.01) |

(52) U.S. Cl.
CPC ...... *E05B 73/0082* (2013.01); *E05B 17/2038* (2013.01); *E05B 37/00* (2013.01); *E05B 37/02* (2013.01); *E05B 65/0067* (2013.01); *E05C 1/10* (2013.01); *F16M 11/041* (2013.01); *G06F 1/1632* (2013.01); *Y10T 70/5009* (2015.04)

(58) Field of Classification Search
USPC ....... 248/551, 552, 553, 346.03, 510; 211/4, 211/8; 361/747, 679.3
See application file for complete search history.

(56) References Cited

U.S. PATENT DOCUMENTS

| | | | | |
|---|---|---|---|---|
| 5,007,256 | A * | 4/1991 | Lowe | 70/14 |
| 6,308,928 | B1 * | 10/2001 | Galant | 248/553 |
| 6,711,921 | B1 * | 3/2004 | Yang | 70/58 |
| 6,763,690 | B2 * | 7/2004 | Galant | 70/58 |
| 7,298,611 | B1 * | 11/2007 | Carnevali | 361/679.55 |
| 7,315,453 | B1 * | 1/2008 | Carnevali | 361/724 |
| 7,417,855 | B2 * | 8/2008 | Carnevali | 361/679.41 |
| 7,426,108 | B2 * | 9/2008 | Carnevali | 361/679.41 |
| 7,508,661 | B2 * | 3/2009 | Carnevali | 361/679.41 |
| 7,540,175 | B2 * | 6/2009 | Kalous et al. | 70/63 |
| 7,573,706 | B2 * | 8/2009 | Carnevali | 361/679.4 |
| 7,583,495 | B2 * | 9/2009 | Carnevali | 361/679.29 |
| 7,823,844 | B2 * | 11/2010 | Carnevali | 248/176.1 |
| 7,839,118 | B2 * | 11/2010 | Carnevali | 320/107 |
| 7,894,180 | B2 * | 2/2011 | Carnevali | 361/679.06 |

(Continued)

*Primary Examiner* — Bradley Duckworth
(74) *Attorney, Agent, or Firm* — Charles J. Rupnick (57) ABSTRACT

A support apparatus having a variable security level, including a tray for receiving a portable electronic device. The tray has a mounting interface structure on its outside backing surface. An unsecurable retainer mechanism releasably retains the portable electronic device in the tray. A variable level security mechanism securably retains the portable electronic device in the tray, the variably securable latching element includes: a latching element that is movable between a latched configuration relative to the tray for securably latching the portable electronic device in the tray, and an unlatched configuration, a security element that is movable between a secured configuration for alternatively securing the latching element in the latched and unlatched configurations thereof, and an unsecured configuration, and a lock element that is coupled to the security element for alternatively locking the security element in the secured and unsecured configurations.

25 Claims, 6 Drawing Sheets

(56) References Cited

U.S. PATENT DOCUMENTS

| | | | | |
|---|---|---|---|---|
| 8,074,951 B2* | 12/2011 | Carnevali | ................. | 248/313 |
| 8,091,850 B2* | 1/2012 | Carnevali | ................. | 248/346.04 |
| 8,179,672 B2* | 5/2012 | Carnevali | ................. | 361/679.41 |
| 2008/0002369 A1* | 1/2008 | Carnevali | ................. | 361/724 |
| 2008/0003860 A1* | 1/2008 | Carnevali | ................. | 439/296 |

* cited by examiner

SUPPORT DEVICE HAVING VARIABLE SECURITY LEVEL

FIELD OF THE INVENTION

The present invention relates generally to support apparatus, including cradles and docking stations, for holding portable electronic devices such as portable computers and other the like, and in particular to support apparatus having a latching element lockable by a plunger-type lock, such as a combination lock, for securing therein the portable electronic devices.

BACKGROUND OF THE INVENTION

Support apparatus, including cradles and docking stations, for holding portable electronic devices such as portable computers and other the like are generally well-known. Support apparatus are generally well-known having locking mechanisms for securing the portable device against inadvertent or intentional removal.

However, the locking mechanisms of known cradle and docking station apparatus are limited to only engaging in a manner that permanently secures the device therein until disengaged by a user having the correct combination or other key.

SUMMARY OF THE INVENTION

The present invention is a support apparatus, such as but not limited to a cradle or docking station, for holding portable electronic devices such as portable computers and the like.

According to one aspect, the support apparatus includes a latching element that is movable between a latched position relative to the support apparatus for retaining therein a portable electronic device, and an unlatched position for permitting removal of the portable electronic device from the support apparatus. The latching element is optionally resiliently biased toward the latched position for automatically latching the portable electronic device in the support apparatus. For example, a tongue member of the latching element is optionally spring loaded to resiliently bias it toward an extended configuration in an interference relationship with a portion of the portable electronic device. Furthermore, the tongue member may include a sloping or inclined lead-in surface, similar to a common door latch, for pushing the tongue against the biasing spring toward a retracted configuration for letting the portable electronic device become seated relative to the support apparatus, while the biasing spring operates to urge the tongue back into the extended configuration once the portable electronic device is seated.

According to another aspect, the support apparatus includes a plunger-type security mechanism for fixing the latching element either in the extended configuration for retaining the portable electronic device in the support apparatus, or in the retracted configuration for permitting removal of the portable electronic device from the support apparatus. The plunger-type security mechanism includes a plunger element that is fixedly engageable with the tongue member of the latching element for fixing the tongue member in each of the extended or retracted states, and a lock element that is operable for locking the security mechanism against tampering. The lock element requires application of a combination or other key mechanism for releasing the security mechanism in order to unfix the latching element for movement of the plunger element between the extended and retracted configurations.

According to another aspect, the plunger-type security mechanism includes a resilient biasing element that is optionally configured for biasing the plunger element either toward the extended configuration or the retracted configuration.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

As required, a detailed illustrative embodiment of the present support apparatus is disclosed herein. However, techniques, systems and operating structures in accordance with the present support apparatus may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present support apparatus. The following presents a detailed description of an illustrative embodiment (as well as some alternative embodiments) of the present support apparatus.

In the Figures, like numerals indicate like elements.

Figure 1:
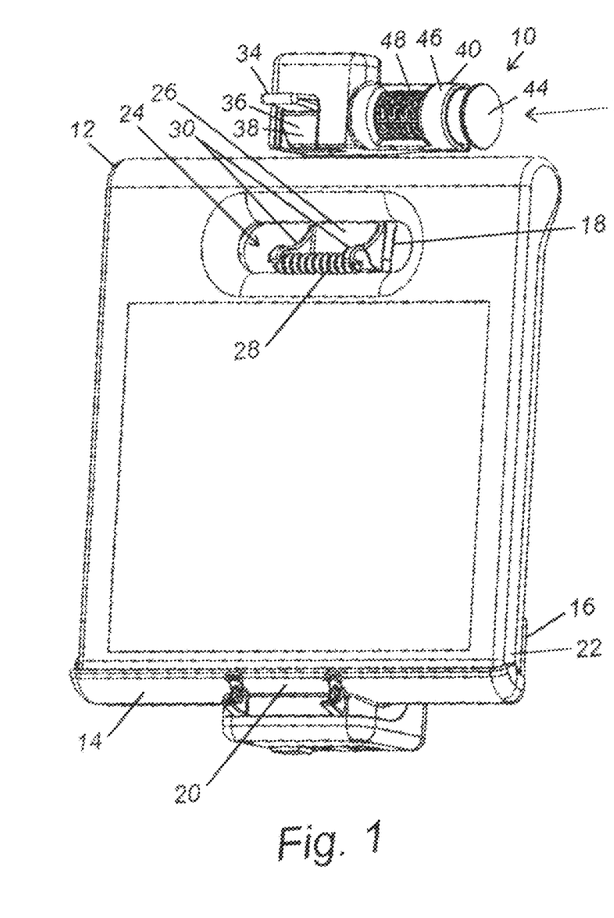
FIG. 1 is a perspective view showing an example of the quick release portable device support apparatus that is structured for receiving and holding a portable electronic device, the support apparatus having an unsecurable retainer mechanism, and a variable level security mechanism including: a variably securable latching element for securably retaining the portable electronic device in the support apparatus, a plunger-type security mechanism for fixing the latching element either extended in its latched configuration or retracted in its unlatched configuration, and a lock element that is operable for locking the security mechanism against tampering.

FIG. 1 illustrates a quick release portable device support apparatus 10, such as but not limited to a cradle or docking station, that is structured for receiving and holding a portable electronic device 12 such as a portable computer or other like device with a variable security level. Here, by example and without limitation, device support apparatus 10 includes a tray 14 formed of a substantially rigid material, such as an injection moldable plastic having a back plane 16 with a substantially rigid spine portion 18. A device receiver pocket 20 formed adjacent to a base portion 22 of back plane 16. Receiver pocket 20 is optionally equipped with electrical input/output connectors, such as a power connector for battery recharging and/or a data entry and retrieval port, in positions corresponding to mating ports on a base 12a of electronic device 12.

An unsecurable retainer mechanism 24 is positioned adjacent to a head portion 26 of back plane 16. For example, unsecurable retainer 24 is a roller assembly 28 rotatably coupled to back plane 16. Roller assembly 28 is suspended on a pair of support flanges 30 extended from back plane 16 in a position for substantially encompassing a portion of electronic device 12 in a manner for releasably retaining electronic device 12 in receiver pocket 20 of apparatus 10. Roller assembly 28 protects device 12 against marring during both insertion and subsequent removal.

In use, base 12a of electronic device 12 is received into the receiver pocket 20 until an upper portion 12b thereof engages roller assembly 28. Device 12 is pushed toward back plane 16, whereby roller assembly 28 is resiliently flexed outwardly away from base portion 22 of back plane 16 to permit upper portion 12b to pass. Past the tipping point, upper portion 12b is urged toward spine portion 18 of back plane 16 by return flexing of roller assembly 28. Pressure of roller assembly presses upper portion 12b until device 12 is securely resting against spine portion 18 of back plane 16. Removal of device 12 is operated by pulling upper portion 12b away from spine portion 18, which again forces roller assembly 28 to resiliently flex outwardly away from base portion 22 of back plane 16 to permit upper portion 12b to pass out of support apparatus 10.

Figure 2:
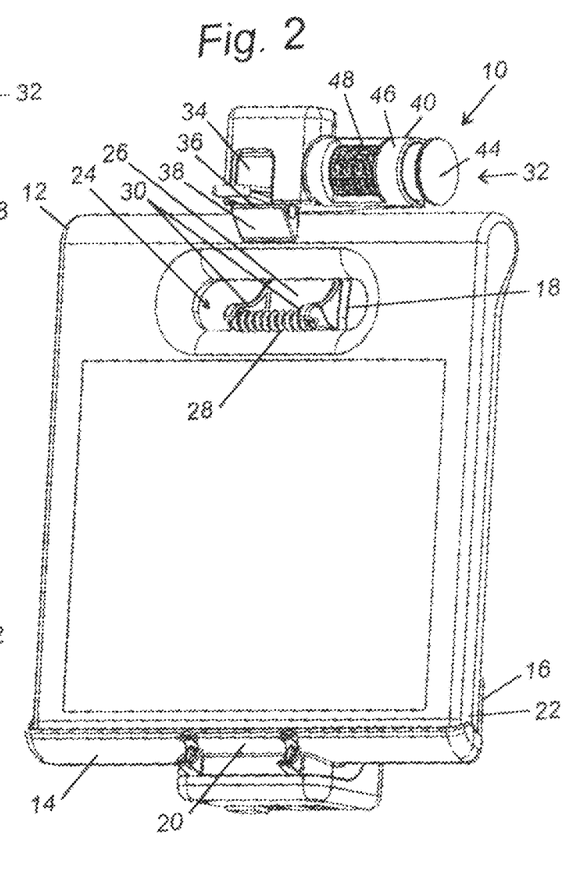
FIG. 2 is another perspective view of the quick release portable device support apparatus.

A variable level security mechanism 32 is structured for securably retaining portable electronic device 12 in tray 14. Variable level security mechanism 32 includes a variably securable latching element 34 for securably retaining portable electronic device 12 in support apparatus 10. When device 12 is seated in support apparatus 10 with base 12a seated in receiver pocket 20 and upper portion 12b is substantially encompassed by roller assembly 28, latching element 34 is movable between a latched position relative to back plane 16 for retaining therein portable electronic device 12, and an unlatched position for permitting removal of device 12 from support apparatus 10. Here, latching element 34 is illustrated in the unlatched position, wherein a tongue member 36 is in a retracted configuration for permitting removal of device 12 from support apparatus 10. Tongue member optionally includes a sloping or inclined lead-in surface 38, similar to a common door latch, for pushing tongue member 36 outwardly toward a retracted configuration away from base portion 22 of back plane 16 to permit upper portion 12b to pass. After portable electronic device 12 become seated relative to back plane 16 of support apparatus 10, tongue member 36 is moved back into an extended configuration substantially encompassing a portion of upper portion 12b of electronic device 12, as shown in FIG. 2.

Variable level security mechanism 32 includes a plunger-type security mechanism 40 for fixing tongue member 36 of latching element 34 either extended in the latched configuration (FIG. 2) for retaining electronic device 12 in support apparatus 10, or retracted in the unlatched configuration (FIG. 1) for permitting subsequent removal of device 12.

Figure 3:
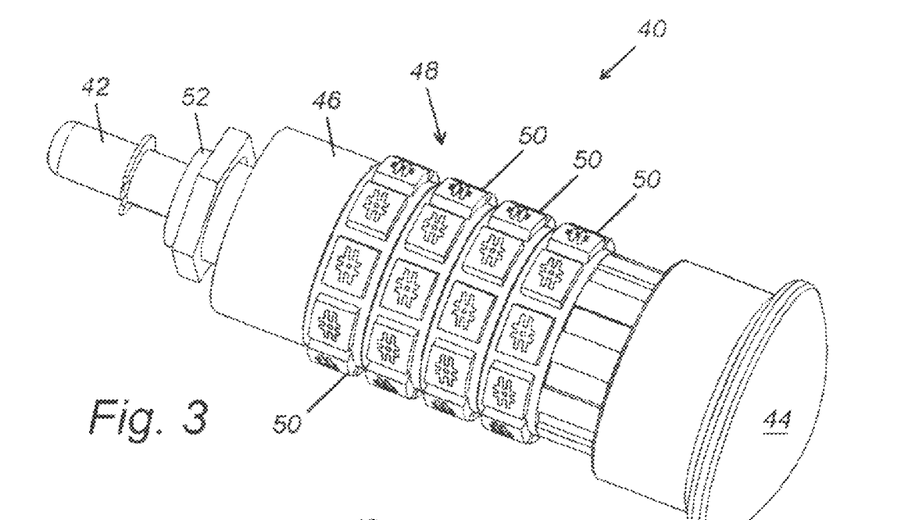
FIG. 3 and FIG. 4 illustrate an example of the plunger-type security mechanism.
Figure 4:
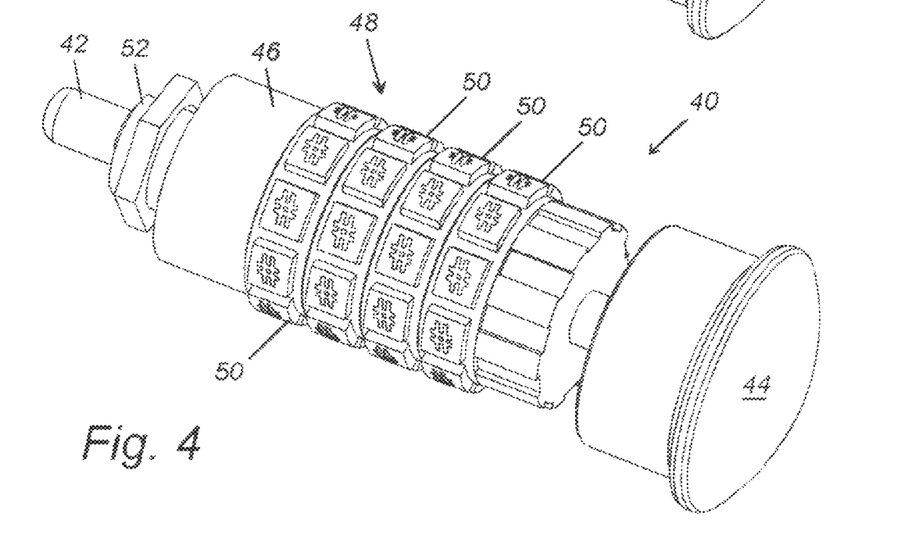

FIG. 3 and FIG. 4 illustrate plunger-type security mechanism 40 including a plunger element 42 that is movable between an extended configuration (FIG. 3) and a retracted configuration (FIG. 4). For example, security mechanism 40 includes a handle 44 coupled to plunger element 42 for manually pulling and pushing plunger element 42 between the extended and retracted configurations relative to a body portion 46. Variable level security mechanism 32 also includes a lock element 48 operable for locking security mechanism 40 against tampering. Lock element 48 requires application of a combination or other key mechanism for releasing security mechanism 40 in order to unfix plunger element 42 relative to body portion 46 for movement between the extended and retracted configurations. By example and without limitation, lock element 48 is embodied as a combination device having a plurality of rotating dials 50 each being inscribed with a plurality of alphanumeric symbols that must be aligned in a prearranged sequence for release. As is generally well understood, rotating dials 50 interact with several discs or cams which directly interact with the locking mechanism. Alternatively, the prearranged sequence is entered through an electronic or mechanical keypad. Once lock element 48 is released, plunger element 42 is unfixed relative to body portion 46 and can be moved by pushing or pulling handle 44 relative to body portion 46.

Security mechanism 40 is adapted for being joined to latching element 34 in a manner that permits plunger element 42 to interact therewith for fixing tongue member 36 in either of the extended and retracted configurations. For example, body portion 46 of plunger-type security mechanism 40 includes a threaded connector 52 opposite from handle 44 surrounding plunger element 42. Threaded connector 52 is adapted for threadedly joining security mechanism 40 to latching element 34.

Figures 5, 6, 7:
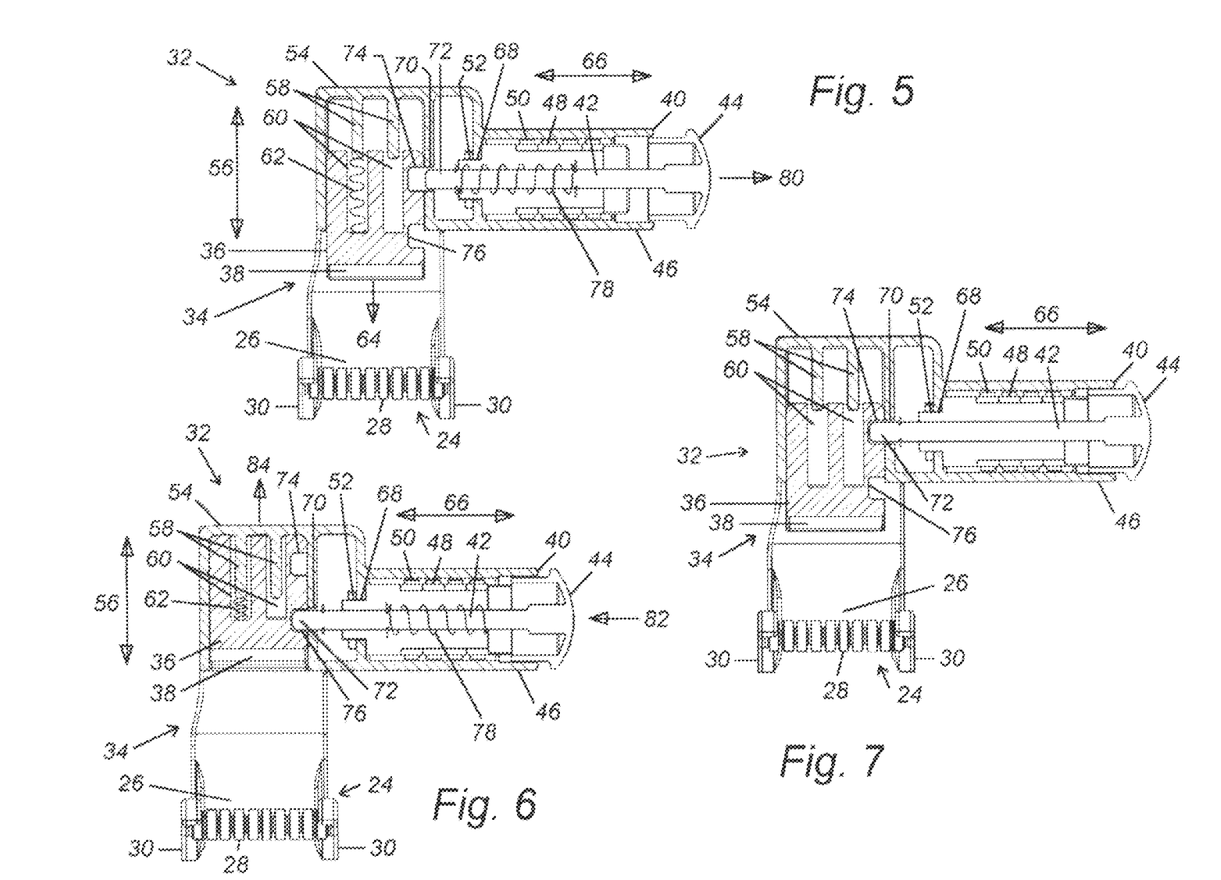
FIG. 5 is an example of a low security configuration of the variable level security mechanism.
FIG. 6 is an example of an unsecured configuration of the variable level security mechanism.
FIG. 7 is an example of both a medium security configuration (lock disengaged) and a high security configuration (lock engaged) of the variable level security mechanism.

FIG. 5 illustrates a low security configuration of variable level security mechanism 32 wherein portable electronic device 12 is retained in support apparatus 10 by latching element 34 with security element 40 being disengaged therefrom in an unsecured configuration, whereby latching element 34 is movable between its extended (shown) and retracted configurations. Lock element 48 is optionally either engaged, or disengaged. When lock element 48 is engaged, security element 40 cannot be disengaged without application of the combination or other key mechanism, and support apparatus 10 cannot be changed from the low security configuration.

Latching element 34 of support apparatus 10 is illustrated by example and without limitation as having a housing 54 suspended above head portion 26 of back plane 16. Housing 54 is positioned optionally either in juxtaposition with roller assembly 28 for operating therewith on substantially the same area of upper portion 12b of device 12, or spaced away from roller assembly 28 (shown) for operating on a different adjacent area of device upper portion 12b.

Here, tongue member 36 is slidably movable along a direction 56 relative to back plane 16 for moving into the extended configuration at least partially occluding head portion 26 of back plane 16 where upper portion 12b of device 12 extends. Accordingly, when in the extended configuration tongue member 36 substantially encompasses at least a portion of electronic device 12 in a manner for releasably retaining electronic device 12 in receiver pocket 20 of apparatus 10. A plurality of interleaved teeth 58 and grooves 60 may be provided between tongue member 36 and housing 54 of latching element 34 for maintaining alignment of tongue member 36 relative to housing 54. Optionally, a resilient biasing mechanism 62 is provided for biasing tongue member 36 along direction 56 toward (arrow 64) the extended configuration relative to back plane 16. For example, resilient biasing mechanism 62 is a conventional compression spring that is compressible and expandable (shown) between tongue member 36 and housing 54.

Housing 54 of latching element 34 is adapted for receiving body portion 46 of security mechanism 40 with plunger element 42 oriented such that plunger element 42 travels along a direction 66 relatively crosswise of direction 56 of tongue member 36, whereby plunger element 42 is operable for interacting with tongue member 36 for fixing it in either of its extended and retracted configurations. For example, housing 54 includes a passage 68 adjacent to tongue member 36 for threadedly receiving threaded connector 52. Furthermore, housing 54 includes a passage 70 adjacent to interleaved teeth 58 and grooves 60 and aligned with passage 68 for slidingly receiving therethrough a tip portion 72 of plunger element 42 into an interference position for retaining tongue member 36 in each of its extended and retracted configurations. For example, tongue member 36 is formed with a mating notch or hole 74 for receiving tip portion 72 of plunger element 42 thereinto for retaining tongue member 36 in its extended configuration. Tongue member 36 is formed with another mating notch or hole 76 for receiving tip portion 72 of plunger element 42 thereinto for retaining tongue member 36 in its retracted configuration. When resilient biasing mechanism 62 is present, tongue member 36 is urged into its extended configuration when tip portion 72 of plunger element 42 is retracted from mating hole 76.

Security mechanism 40 optionally includes a resilient biasing member 78 that is optionally configured for biasing plunger element 42 along travel direction 66 either toward its retracted configuration (arrow 80) away from latching element 34 for disengaging its tip portion 72 from tongue member 36, or toward (FIG. 6, arrow 82) its extended configuration toward latching element 34 for engaging with tongue member 36. For example, resilient biasing mechanism 78 is a conventional compression spring that is compressible and expandable (shown) between plunger element 42 and body portion 46 of security mechanism 40 adjacent to threaded connector 52. Accordingly, security element 34 substantially automatically moves toward one of retracted configuration (shown) for disengaging its tip portion 72 from tongue member 36, or its extended configuration for engaging with tongue member 36 (FIG. 6).

Here, plunger 42 of security element 40 is shown disengaged from both mating hole 74 and mating hole 76, whereby tongue member 36 is slidable in housing element 54 toward each of its extended and retracted configurations. Optionally, lock element 48 is engaged for locking security mechanism 40 against inadvertent locking of latching element 34. Resilient biasing mechanism 62 is expanded here in housing element 54 for urging tongue member 36 into its extended configuration.

FIG. 6 illustrates an unsecured configuration of variable level security mechanism 32 wherein portable electronic device 12 is releasably retained in tray 14 of support apparatus 10 only by roller assembly 28 or another unsecurable retainer mechanism 24. Latching element 34 is fixed in its retracted and disengaged position relative to back plane 16 by engagement of security element 40 therewith in a secured configuration, whereby latching element 34 does not interfere with removal of device 12 from tray 14 of support apparatus 10. Lock element 48 is optionally either engaged, or disengaged.

Tongue member 36 is retracted (arrow 84) along direction 56 into housing 54 with resilient biasing mechanism 62 being compressed therebetween. Security mechanism 40 is configured with tip portion 72 of plunger element 42 being engaged with mating hole 76, whereby tongue member 36 is fixed in housing element 54 in its retracted configuration. Accordingly, device 12 is removed by simply pulling upper portion 12b away from spine portion 18 past roller assembly 28, as disclosed herein.

Here, plunger 42 of security element 40 is shown engaged with mating hole 74 for fixing tongue member 36 in housing element 54 in its retracted configuration relative to back plane 16 of support apparatus 10, whereby tongue member 36 of latching mechanism 34 cannot interfere with removal of portable electronic device 12 from support apparatus 10.

Optionally, lock element 48 is engaged for locking security mechanism 40 against inadvertent locking of latching element 34. When lock element 48 is engaged, security element 40 cannot be disengaged without application of the combination or other key mechanism, and support apparatus 10 cannot be changed from its unsecured configuration.

When present, optional resilient biasing member 78 is configured for biasing plunger element 42 along travel direction 66 toward latching element 34 for engaging with tongue member 36.

FIG. 7 illustrates both a medium security configuration (lock 48 disengaged) and a high security configuration (lock 48 engaged) of variable level security mechanism 32 wherein portable electronic device 12 is retained in support apparatus 10 by latching element 34 with security element 40 being secured in engagement with latching element 34, whereby latching element 34 is fixed in its extended configuration. Accordingly, electronic device 12 cannot be removed from support apparatus 10. Lock element 48 is optionally either engaged, or disengaged. Engagement or disengagement of lock element 48 differentiates between the medium and high security configurations. In the medium security configuration, security element 40 is unsecured and can be disengaged at will without application of the combination or other key mechanism. In the high security configuration, security element 40 is secured and cannot be disengaged from latching element 34 without application of the combination or other key mechanism, and support apparatus 10 cannot be changed from the high security configuration.

Here, plunger 42 of security element 40 is shown engaged with mating hole 74 for fixing tongue member 36 in housing element 54 in its extended configuration relative to back plane 16 of support apparatus 10, whereby tongue member 36 of latching mechanism 34 interferes with and prevents removal of portable electronic device 12 from support apparatus 10.

In the medium security configuration of variable level security mechanism 32, lock element 48 is disengaged for leaving security mechanism 40 unlocked, whereby security mechanism 40 can be disengaged at will for disengaging latching element 34.

In the high security configuration, lock element 48 is engaged for locking security mechanism 40 against inadvertent or intentional disengaging of latching element 34.

Table I summarizes configuration combinations of tongue member 36, plunger element 42 and lock element 48 for the variable security configurations of security mechanism 32, including the locked (option a) and unlocked (option b) unsecured configurations, the locked (option c) and unlocked (option d) low security configurations, the unlocked medium security configuration (option e), and the locked high security configuration (option f).

TABLE I

| Option | Security Configuration | Configuration of tongue 36 | Configuration of plunger 42 | Configuration of lock 48 |
| --- | --- | --- | --- | --- |
| a | unsecured | fixed disengaged | fixed engaged | locked |
| b | unsecured | fixed disengaged | engaged | unlocked |
| c | low | movable in/out | fixed disengaged | locked |
| d | low | movable in/out | disengaged | unlocked |
| e | medium | fixed engaged | engaged | unlocked |
| f | high | fixed engaged | fixed engaged | locked |

Figure 8:
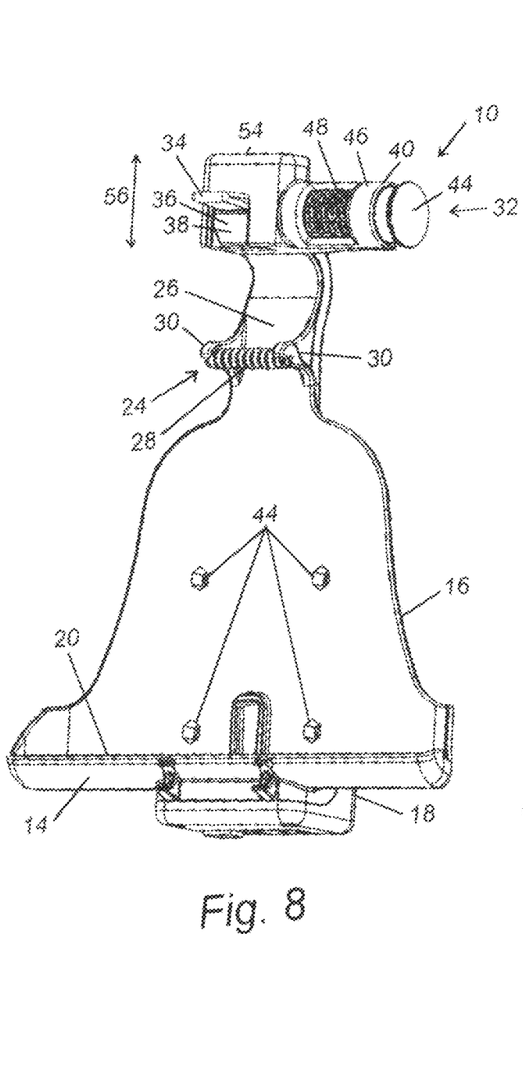
FIG. 8 is a perspective view of the quick release portable device support apparatus.

FIG. 8 illustrates support apparatus 10 having tongue member 36 of latching mechanism 34 in its retracted configuration for permitting removal of device 12 from support apparatus 10. A mounting interface structure 44 formed on an outside backing surface 46 of the back plane 16 is structured for mounting either directly or indirectly on an external surface. By example and without limitation, the mounting interface structure 44 includes a pair holes 48 each structured to receive a fastener therethrough.

Figure 9:
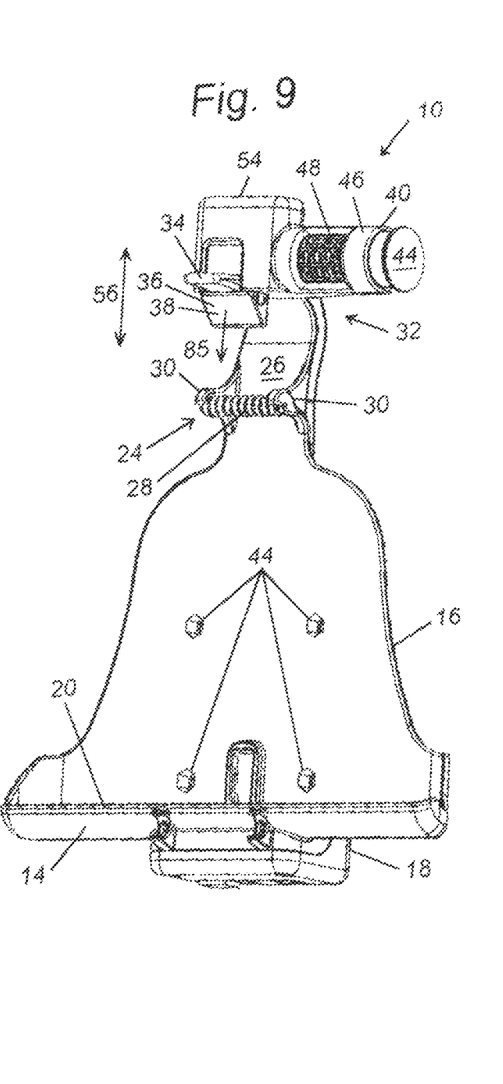
FIG. 9 is another perspective view of the quick release portable device support apparatus.

FIG. 9 illustrates support apparatus 10 having tongue member 36 of latching mechanism 34 in its extended configuration for blocking removal of device 12 from support apparatus 10. When security mechanism 40 is in its unsecured configuration with plunger 42 disengaged from tongue member 36 of latching element 34, during installation of device 12, similar to a common door latch, optional sloping or inclined lead-in surface 38 can be used for pushing tongue member 36 outwardly toward a retracted configuration away from base portion 22 of back plane 16 to permit upper portion 12b to pass. After portable electronic device 12 becomes seated relative to back plane 16 of support apparatus 10, tongue member 36 is moved back into an extended configuration substantially encompassing a portion of upper portion 12b of electronic device 12, as shown in FIG. 2. For example, biasing mechanism 62 urges tongue member 36 along direction 56 toward (arrow 64) its extended configuration relative to back plane 16.

Figures 10, 11, 12:
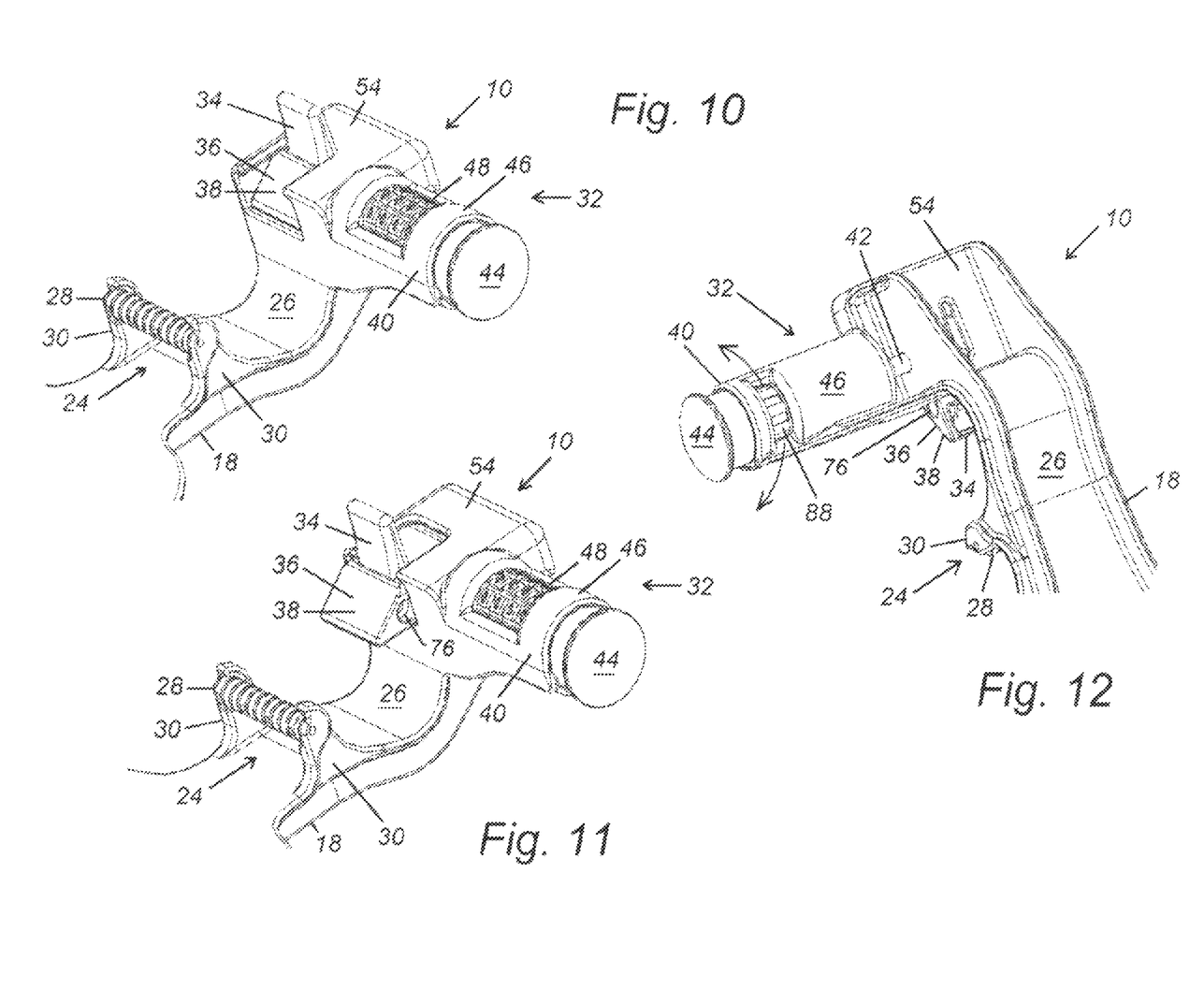
FIG. 10 is a close-up view of the variable level security mechanism.
FIG. 11 is a different close-up view of the variable level security mechanism.
FIG. 12 is different close-up view of the variable level security mechanism.

FIG. 10 is a close-up view of variable level security mechanism 32 having tongue member 36 of latching mechanism 34 in its retracted configuration for permitting removal of device 12 from support apparatus 10.

FIG. 11 is a close-up view of variable level security mechanism 32 having tongue member 36 of latching mechanism 34 in its extended configuration for blocking removal of device 12 from support apparatus 10.

FIG. 12 is a close-up view of variable level security mechanism 32 as seen from the backside of tray 14, wherein tongue member 36 of latching mechanism 34 is shown in its extended configuration for blocking removal of device 12 from support apparatus 10. Lock element 48 is shown in the unlocked and retracted configuration, wherein manipulation of a switch 88 permits user to change the combination of lock element 48. The combination is only changeable when lock element 48 is in the retracted configuration, as shown here.

Figure 13:
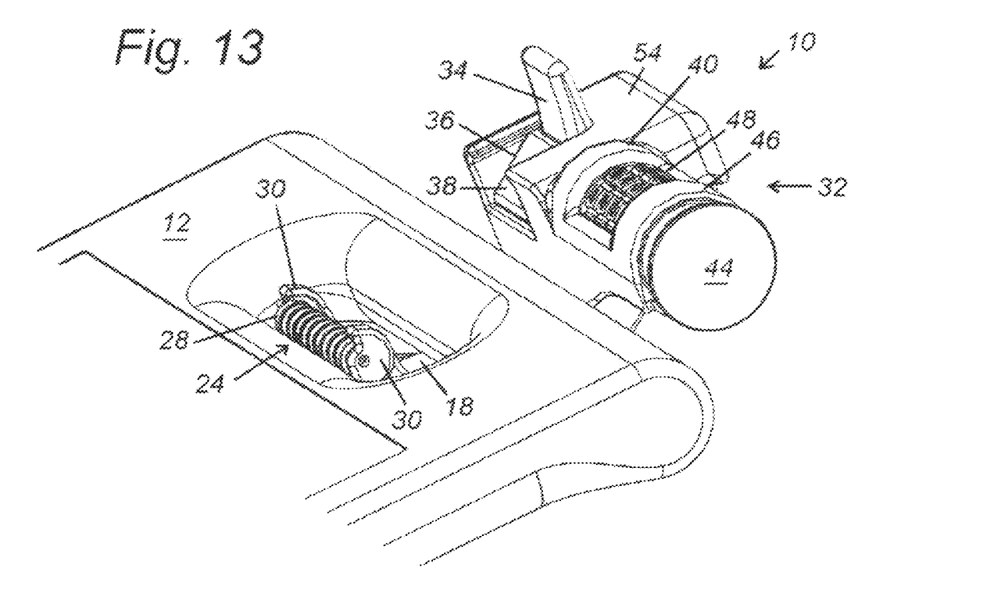
FIG. 13 is a close-up view of the variable level security mechanism in its unsecured configuration with the unsecurable retainer mechanism releasably retaining the portable electronic device in the tray of the support apparatus.

FIG. 13 is a close-up view of variable level security mechanism 32 in its unsecured configuration having tongue member 36 of latching mechanism 34 in its retracted configuration for permitting removal of device 12 from support apparatus 10. Here, only roller assembly 28 of unsecurable retainer mechanism 24 releasably retains portable electronic device 12 in tray 14 of support apparatus 10.

Figure 14:
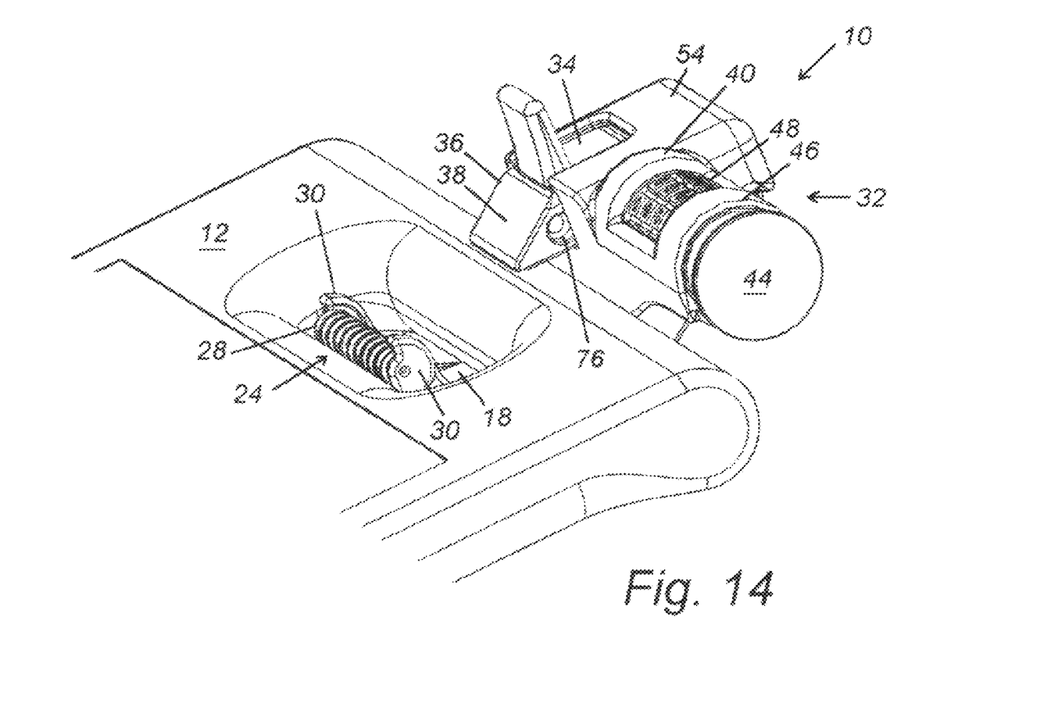
FIG. 14 is a close-up view of the variable level security mechanism in one secured configuration having the variably securable latching mechanism extended in its latched configuration for blocking removal of the portable electronic device from the support apparatus.

FIG. 14 is a close-up view of variable level security mechanism 32 in one secured configuration having tongue member 36 of latching mechanism 34 in its extended and latched configuration for blocking removal of device 12 from support apparatus 10. Here, variable level security mechanism 32 is shown in one of: i) the low security configuration wherein plunger-type security mechanism 40 is arranged in its unsecured configuration disengaged from latching mechanism 34, and lock element 48 is arranged in either its locked or unlocked configuration relative to plunger-type security mechanism 40; ii) the medium security configuration wherein plunger-type security mechanism 40 is arranged in its secured configuration engaged with latching mechanism 34, and lock element 48 is arranged in its unlocked configuration relative to plunger-type security mechanism 40; and iii) the high security configuration wherein plunger-type security mechanism 40 is arranged in its secured configuration engaged with latching mechanism 34, and lock element 48 is arranged in its locked configuration for locking plunger-type security mechanism 40 in its secured configuration.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A support apparatus having a variable security level, comprising:
    a tray structured for receiving a portable electronic device, the tray further comprising a mounting interface structure; and
    a variable level security mechanism structured for securably retaining the portable electronic device in the tray, the variably securable latching mechanism comprising:
        a latching element movable between a latched configuration relative to the tray for securably latching the portable electronic device in the tray, and an unlatched configuration,
        a security element movable between a secured configuration for alternatively securing the latching element in the latched and unlatched configurations thereof, and an unsecured configuration, and
        a lock element coupled to the security element for alternatively locking the security element in the secured and unsecured configurations thereof.

2. The apparatus of claim 1, further comprising an unsecurable retainer mechanism structured for releasably retaining the portable electronic device in the tray.

3. The apparatus of claim 2, wherein the unsecurable retainer mechanism is further independent of the variable level security mechanism.

4. The apparatus of claim 1, wherein the security element is further substantially biased toward one of the secured and unsecured configurations thereof.

5. The apparatus of claim 1, wherein the variable level security mechanism is further operable between:
   i) a low security configuration wherein the security element is in the unsecured configuration thereof; and
   ii) a high security configuration wherein the latching element is in the latched configuration thereof, the security element is in the secured configuration thereof, and the lock element is arranged in a locked configuration thereof for locking the security element in the secured configuration thereof.

6. The apparatus of claim 5, wherein the variable level security mechanism is further operable between: i) the low security configuration; ii) the high security configuration; and
   iii) an unsecured configuration wherein the latching element is in the unlatched configuration thereof, and the security element is in the secured configuration thereof for alternatively securing the latching element in the unlatched configuration thereof.

7. The apparatus of claim 6, wherein in the unsecured configuration of the variable level security mechanism the lock element is further arranged in a locked configuration thereof for locking the security element in the secured configuration thereof.

8. The apparatus of claim 5, wherein the variable level security mechanism is further operable in a medium security configuration wherein the latching element is in the latched configuration thereof, the security element is in the secured configuration thereof, and the lock element is arranged in an unlocked configuration thereof relative to the security element.

9. The apparatus of claim 1, wherein the secured configuration of the security element further comprises alternatively securing the latching element in one of the latched and unlatched configurations thereof.

10. The apparatus of claim 1, wherein the security element further comprises a plunger-type security element.

11. A support apparatus having a variable security level, comprising:
   a tray structured for receiving a portable electronic device, the tray further comprising a mounting interface structure; and
   a variable level security mechanism structured for securably retaining the portable electronic device in the tray, the variable level security mechanism comprising:
      a latching element movable between a latched configuration relative to the tray for securably latching the portable electronic device in the tray, and an unlatched configuration,
      a plunger-type security element movable between a secured configuration for alternatively securing the latching element in the latched and unlatched configurations thereof, and an unsecured configuration, and
      a lock element coupled to the plunger-type security element for locking the plunger-type security element in the secured configuration thereof, wherein the variable level security mechanism is further operable between:
         i) a low security configuration wherein the plunger-type security element is in the unsecured configuration thereof; and
         ii) a high security configuration wherein the latching element is in the latched configuration thereof, the plunger-type security element is in the secured configuration thereof, and the lock element is arranged in a locked configuration thereof for locking the plunger-type security element in the secured configuration thereof,
      wherein the lock element is further coupled to the plunger-type security element for alternatively locking the plunger-type security element in each of the secured and unsecured configurations thereof, and wherein in the low security configuration of the variable level security mechanism the lock element is further arranged in a locked configuration thereof locking the plunger-type security element in the unsecured configuration thereof.

12. A support apparatus having a variable security level, comprising:
   a tray structured for receiving a portable electronic device, the tray further comprising a mounting interface structure;
   a securable latching means changeable between a latched configuration relative to the tray for securably latching the portable electronic device in the tray, and an unlatched configuration for limiting retaining of the portable electronic device;
   a security means lockable in each of a secured configuration for alternatively securing the securable latching element in each of the latched and unlatched configurations thereof, and an unsecured configuration wherein the latching means is able to change between the latched and unlatched configurations thereof independently of the security means; and
   a locking means having a locked configuration for locking the security means in the secured configuration thereof, and having an unlocked configuration for permitting the security means to change between the secured and unsecured configurations thereof.

13. The apparatus of claim 12, further comprising an unsecurable retainer means for releasably retaining the portable electronic device in the tray, the unsecurable retainer means being independent of the securable latching means.

14. The apparatus of claim 12, wherein the security means further comprises means for substantially automatically changing toward one of the secured and unsecured configurations thereof.

15. The apparatus of claim 12, wherein the securable latching means is further operable between:
   i) a low security configuration wherein the security means is in the unsecured configuration thereof for permitting the securable latching means to change between the latched and unlatched configurations thereof; and
   ii) a high security configuration wherein the securable latching means is in the latched configuration thereof, the security means is in the secured configuration thereof, and the locking means is in the locked configuration thereof for locking the security means in the secured configuration thereof for securing the latching means in the latched configuration thereof.

16. The apparatus of claim 15, wherein in ii) the low security configuration, the locking means is further arranged in the locked configuration thereof for locking the security means in the unsecured configuration thereof.

17. The apparatus of claim 15, wherein the securable latching means is further operable between: i) the low security configuration; ii) the high security configuration; and
    iii) an unsecured configuration wherein the securable latching means is in the unlatched configuration thereof, and the security means is in the secured configuration thereof for securing the latching element in the unlatched configuration thereof.

18. The apparatus of claim 17, wherein in iii) the unsecured configuration, the locking means is further arranged in the locked configuration thereof for locking the security means in the secured configuration thereof.

19. The apparatus of claim 15, wherein the securable latching means is further operable between: i) the low security configuration; ii) the high security configuration; and
    iii) a medium security configuration wherein the securable latching means is in the latched configuration thereof, the security means is in the secured configuration thereof, and the locking means is in the unlocked configuration thereof for permitting the security means to change between the secured and unsecured configurations thereof.

20. The apparatus of claim 15, wherein the locked configuration of the locking means relative to the security means is further structured for alternatively locking the security means in each of the secured configuration thereof and the unsecured configuration thereof.

21. The apparatus of claim 20, wherein in ii) the low security configuration, the locking means is further arranged in the locked configuration thereof for locking the security means in the unsecured configuration thereof.

22. A method for securing a support apparatus at variable security levels, the method comprising:
    structuring a tray for receiving a portable electronic device, the structuring of the tray further comprising a structuring mounting interface on the tray;
    with the portable electronic device releasably retained in the tray, variably securing the device in the tray by the method of:
    changing a securable latching element between a latched configuration relative to the tray for securably latching the portable electronic device in the tray, and an unlatched configuration for releasing the portable electronic device;
    changing a security element between a secured configuration for alternatively securing the latching element in each of the latched and unlatched configurations thereof, and an unsecured configuration for permitting the latching element to change between the latched and unlatched configurations thereof; and
    changing a locking element between a locked configuration relative to the security element for locking the security element in the secured configuration thereof, and an unlocked configuration for permitting the security element to change between the secured and unsecured configurations thereof; and
    wherein variably securing the device in the tray further comprises operating the securable latching element, the security element, and the locking element between each of:
        i) a low security configuration wherein the security element is in the unsecured configuration thereof; and
        ii) a high security configuration wherein the latching element is in the latched configuration thereof, the security element is in the secured configuration thereof, and the locking element is in the locked configuration thereof for locking the security element in the secured configuration thereof; and
    wherein changing the locking element between the locked configuration relative to the security element further comprises changing the locking element for alternatively locking the security element in each of the secured and unsecured configurations thereof; and
    wherein in i) the low security configuration of the variable level security mechanism the lock element is further arranged in the locked configuration thereof for locking the security element in the unsecured configuration thereof.

23. The method of claim 22, wherein variably securing the device in the tray further comprises operating the securable latching element, the security element, and the locking element between each of: i) the unsecured configuration; ii) the low security configuration; iii) the high security configuration; and
    iv) a medium security configuration wherein the latching element is in the latched configuration thereof, the security element is in the secured configuration thereof, and locking element is in the unlocked configuration thereof for permitting the security element to change between the secured and unsecured configurations thereof.

24. The method of claim 22, wherein variably securing the device in the tray further comprises operating the securable latching element, the security element, and the locking element between each of:
    i) the low security configuration;
    ii) the high security configuration; and
    iii) an unsecured configuration wherein the latching element is in the unlatched configuration thereof, and the security element is in the unsecured configuration thereof.

25. The method of claim 22, further comprising providing on the tray an unsecurable retainer for releasably retaining the portable electronic device in the tray.

* * * * *